United States Patent
Gang et al.

(10) Patent No.: US 12,288,896 B2
(45) Date of Patent: Apr. 29, 2025

(54) BATTERY MODULE HAVING BASE INSULATING MEMBER

(71) Applicant: LG ENERGY SOLUTION, LTD., Seoul (KR)

(72) Inventors: In-Jae Gang, Daejeon (KR); Jin-Kyu Shin, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 491 days.

(21) Appl. No.: 17/762,198

(22) PCT Filed: Aug. 20, 2020

(86) PCT No.: PCT/KR2020/011134
§ 371 (c)(1),
(2) Date: Mar. 21, 2022

(87) PCT Pub. No.: WO2021/060712
PCT Pub. Date: Apr. 1, 2021

(65) Prior Publication Data
US 2022/0376355 A1    Nov. 24, 2022

(30) Foreign Application Priority Data
Sep. 27, 2019  (KR) .......... 10-2019-0119919

(51) Int. Cl.
*H01M 50/392* (2021.01)
*H01M 50/204* (2021.01)
(Continued)

(52) U.S. Cl.
CPC ....... *H01M 50/392* (2021.01); *H01M 50/204* (2021.01); *H01M 50/289* (2021.01); *H01M 50/502* (2021.01)

(58) Field of Classification Search
None
See application file for complete search history.

(56) References Cited

U.S. PATENT DOCUMENTS

| | | | | |
|---|---|---|---|---|
| 2007/0259263 A1* | 11/2007 | Shibuya | .............. | H01M 50/213 429/186 |
| 2010/0015512 A1* | 1/2010 | Inoue | .................. | H01M 10/643 361/714 |
| 2012/0251873 A1* | 10/2012 | Miyawaki | ........... | H01M 50/209 429/178 |
| 2016/0020446 A1 | 1/2016 | Zheng et al. | | |

(Continued)

FOREIGN PATENT DOCUMENTS

| | | |
|---|---|---|
| CN | 202541277 U | 11/2012 |
| EP | 2 634 835 A1 | 9/2013 |

(Continued)

OTHER PUBLICATIONS

International Search Report (PCT/ISA/210) issued in PCT/KR2020/011134 mailed on Nov. 23, 2020.

*Primary Examiner* — Lisa S Park
(74) *Attorney, Agent, or Firm* — Birch, Stewart, Kolasch & Birch, LLP (57) ABSTRACT

A battery module prevents an electrolyte solution from leaking out in the event of electrolyte solution leakage. To achieve the object, the battery module according to the present disclosure includes at least one cell assembly including a plurality of secondary batteries stacked in a direction, each secondary battery including an electrode lead, a base plate disposed below the cell assembly and extending in a horizontal direction to support a bottom of the cell assembly, and at least one base insulation member interposed between the cell assembly and the base plate and having a receiving portion formed concavely in a downward direction to receive a part of the cell assembly.

13 Claims, 10 Drawing Sheets

(51) Int. Cl.
  *H01M 50/209*   (2021.01)
  *H01M 50/24*    (2021.01)
  *H01M 50/289*   (2021.01)
  *H01M 50/502*   (2021.01)
  *H01M 50/505*   (2021.01)

(56) References Cited

U.S. PATENT DOCUMENTS

2017/0244139  A1*  8/2017  Tononishi ............ H01G 9/0029
2018/0175464  A1   6/2018  Kim et al.
2020/0099034  A1   3/2020  Jin et al.

FOREIGN PATENT DOCUMENTS

| EP | 2 797 158 A1 | | 10/2014 |
|---|---|---|---|
| JP | 11-18555 A | | 1/1999 |
| JP | 2006-196331 A | | 7/2006 |
| JP | 2008-260905 A | | 9/2006 |
| JP | 2007-328926 A | | 12/2007 |
| JP | 2009-146606 A | | 7/2009 |
| JP | 2014-35918 A | | 2/2014 |
| JP | 2016-4772 A | | 1/2016 |
| JP | 2017-98011 A | | 6/2017 |
| JP | 2016-004772 | * | 4/2018 |
| JP | 2018-163740 A | | 10/2018 |
| JP | 2019-75245 A | | 5/2019 |
| JP | 2019-96510 A | | 6/2019 |
| KR | 10-2006-0027268 A | | 3/2006 |
| KR | 10-2016-0094844 A | | 8/2016 |
| KR | 10-2016-0149099 A | | 12/2016 |
| KR | 10-2017-0037125 A | | 4/2017 |
| KR | 10-2017-0094981 A | | 8/2017 |
| WO | WO 2019/088714 A1 | | 5/2019 |

* cited by examiner

BATTERY MODULE HAVING BASE INSULATING MEMBER

TECHNICAL FIELD

The present disclosure relates to a battery module comprising a base insulation member, and more particularly, to a battery module for preventing an electrolyte solution from leaking out while the battery module is in use.

The present application claims the benefit of Korean Patent Application No. 10-2019-0119919 filed on Sep. 27, 2019 with the Korean Intellectual Property Office, the disclosure of which is incorporated herein by reference in its entirety.

BACKGROUND ART

Currently, commercially available secondary batteries include nickel-cadmium batteries, nickel-hydrogen batteries, nickel-zinc batteries, lithium secondary batteries and the like, and among them, lithium secondary batteries have little or no memory effect, and thus they are gaining more attention than nickel-based secondary batteries for their advantages that recharging can be done whenever it is convenient, the self-discharge rate is very low and the energy density is high.

A lithium secondary battery primarily uses lithium-based oxide and a carbon material as a positive electrode active material and a negative electrode active material respectively. The lithium secondary battery includes an electrode assembly including a positive electrode plate and a negative electrode plate coated with the positive electrode active material and the negative electrode active material respectively with a separator interposed between the positive electrode plate and the negative electrode plate, and a packaging or a battery pouch case in which the electrode assembly is hermetically received together with an electrolyte solution.

Recently, secondary batteries are widely used not only in small devices such as portable electronic devices, but also in medium- and large-sized devices such as vehicles and energy storage systems. For use in medium- and large-sized device applications, many secondary batteries are electrically connected to increase the capacity and output. In particular, pouch-type secondary batteries are easy to stack, and due to the advantage, they are widely used in medium- and large-sized devices.

More recently, with the use as a source of energy and the growing need for large-capacity structures, there is an increasing demand for a plurality of secondary batteries electrically connected in series and/or in parallel, and a battery pack including a battery module including the secondary batteries received therein and a battery management system (BMS).

In general, the battery pack includes an external housing made of metal to protect the plurality of secondary batteries from external impacts or receive and store them. In recent years, there is a rising demand for high-capacity battery packs.

However, the conventional battery rack includes a plurality of battery modules. Each battery module may include a plurality of secondary batteries. In this instance, during the charge and discharge of the plurality of the secondary batteries, the volume of the secondary batteries repeatedly expands and contracts and the electrolyte solution may leak out due to the abnormal behaviors of the secondary batteries. When the leaking electrolyte solution contacts the electrode terminal of the adjacent secondary battery, an electrical short circuit occurs between the plurality of secondary batteries, there is a risk that thermal runaway or a fire of the battery module may occur.

Moreover, the electrolyte solution is fatally harmful to the human health, so when the electrolyte solution leaks out of the battery module, there is a high risk of losses of human lives.

DISCLOSURE

Technical Problem

The present disclosure is designed to solve the above-described problem, and therefore the present disclosure is directed to providing a battery module for preventing an electrolyte solution from leaking out while the battery module is in use.

These and other objects and advantages of the present disclosure can be understood by the following description, and will be apparent from the embodiments of the present disclosure. In addition, it will be readily appreciated that the objects and advantages of the present disclosure can be realized by means and combinations thereof.

Technical Solution

To solve the above-described object, a battery module according to the present disclosure includes at least one cell assembly including a plurality of secondary batteries stacked in a stacking direction, each secondary battery including an electrode lead, a base plate disposed below the at least one cell assembly and extending in a horizontal direction to support a bottom of the at least one cell assembly, and at least one base insulation member interposed between the at least one cell assembly and the base plate and having a first receiving portion formed concavely in a downward direction to receive a part of the at least one cell assembly.

Additionally, the battery module may further include a top plate mounted on top of the at least one cell assembly and extending in the horizontal direction to cover a top of the at least one cell assembly, and at least one top insulation member interposed between the at least one cell assembly and the top plate and having a second receiving portion formed concavely in an upward direction to receive a part of the at least one cell assembly.

Additionally, the base plate may include a compartment portion extending in the upward direction on each of left and right sides at a lower end of the at least one cell assembly.

Additionally, the base insulation member may include a fixing portion extending leftwards and rightwards from the first receiving portion and extending with at least one bending to cover the compartment portion of the base plate.

Additionally, the base plate may further include a stopper on an inner side to support a front outer side or a rear outer side of the first receiving portion of the base insulation member.

Additionally, the battery module may further include a busbar frame disposed on a left or right side of the at least one cell assembly, and having a through-hole through which at least one electrode lead extends, and a busbar assembly mounted on left and right outer sides of the busbar frame and having a conductive metal to electrically connect the plurality of secondary batteries.

Additionally, the base insulation member may include a barrier disposed on the compartment portion of the base plate and extending to come into contact with the busbar frame.

Additionally, the at least one cell assembly may include at least two cell assemblies, and the base insulation member may include a partition interposed between the at least two cell assemblies.

Additionally, the base plate may include a receiving groove recessed in the downward direction, and the base insulation member may include an inner groove which is inserted into the receiving groove.

Additionally, to achieve the above-described object, a battery rack according to the present disclosure includes at least two battery modules and a rack case to receive the battery modules.

Additionally, to achieve the above-described object, an energy storage system according to the present disclosure includes at least two battery racks.

Advantageous Effects

According to an aspect of the present disclosure, the present disclosure includes the base plate disposed below the cell assembly and the at least one base insulation member interposed between the cell assembly and the base plate and having the receiving portion formed concavely in the downward direction to receive a part of the cell assembly, thereby effectively electrically isolating the base plate from the cell assembly. Furthermore, the receiving portion provided in the base insulation member may prevent the leaking electrolyte solution from flowing out of the battery module when the electrolyte solution leakage occurs due to abnormal behaviors during the charge and discharge of the battery module. Accordingly, it is possible to greatly increase the safety of the battery module while in use.

Additionally, according to an aspect of an embodiment of the present disclosure, the present disclosure includes the at least one top insulation member interposed between the cell assembly and the top plate, and having the receiving portion formed concavely in the upward direction to receive a part of the cell assembly, thereby effectively electrically isolating the top plate from the cell assembly. Furthermore, the receiving portion provided in the base insulation member may prevent the leaking electrolyte solution from spreading out from the top of the battery module when the electrolyte solution leakage occurs due to abnormal behaviors during the charge and discharge of the battery module. Accordingly, it is possible to greatly increase the safety of the battery module while in use.

Additionally, according to an aspect of the present disclosure, the base insulation member includes the fixing portion extending to the left and right from the receiving portion and extending with at least one bending to cover the compartment portion of the base plate, thereby stably fixing the base insulation member onto the base plate. Accordingly, it is possible to increase the production efficiency of the battery module and help to prevent the base insulation member from being separated from the base plate.

Moreover, according to another aspect of the present disclosure, the base insulation member includes the barrier disposed on the compartment portion of the base plate and extending to come into contact with the busbar frame, so that the electrolyte solution leaking out of the cell assembly may be first collected in the receiving portion provided in the base insulation member, and then the barrier may prevent the electrolyte solution received in the receiving portion from flooding or leaking out due to an external impact. Accordingly, it is possible to greatly increase the safety of the battery module while in use.

BRIEF DESCRIPTION OF THE DRAWINGS

The accompanying drawings illustrate preferred embodiments of the present disclosure, and together with the following detailed description, serve to provide a further understanding of the technical spirit of the present disclosure. However, the present disclosure is not to be construed as being limited to the drawings.

DETAILED DESCRIPTION

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation.

Therefore, the embodiments described herein and illustrations shown in the drawings are just a most preferred embodiment of the present disclosure, but not intended to fully describe the technical aspects of the present disclosure, so it should be understood that a variety of other equivalents and modifications could have been made thereto at the time that the application was filed.

Figure 1:
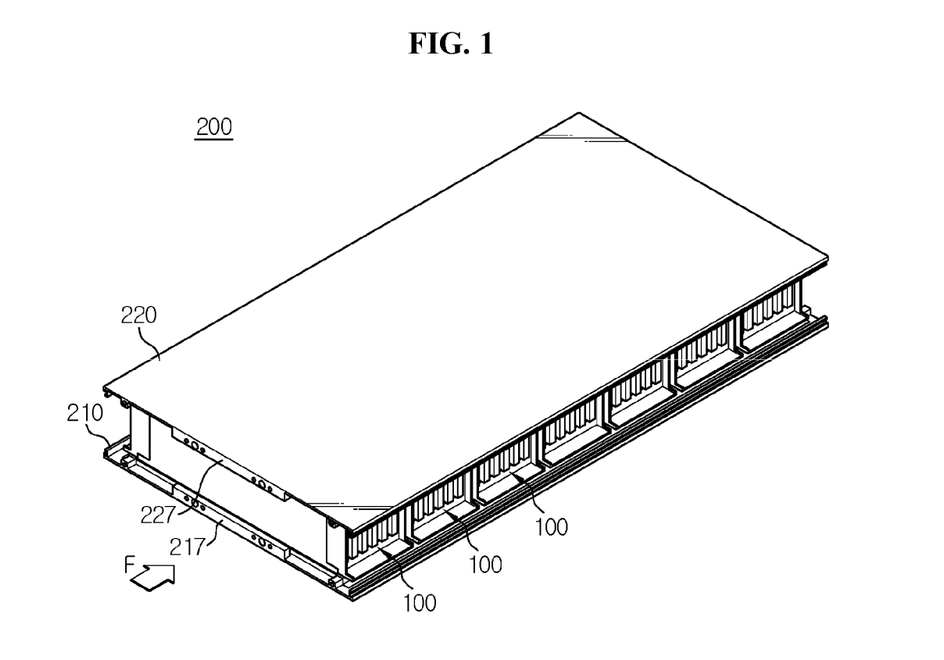
FIG. 1 is a perspective view schematically showing a battery module according to an embodiment of the present disclosure.
Figure 2:
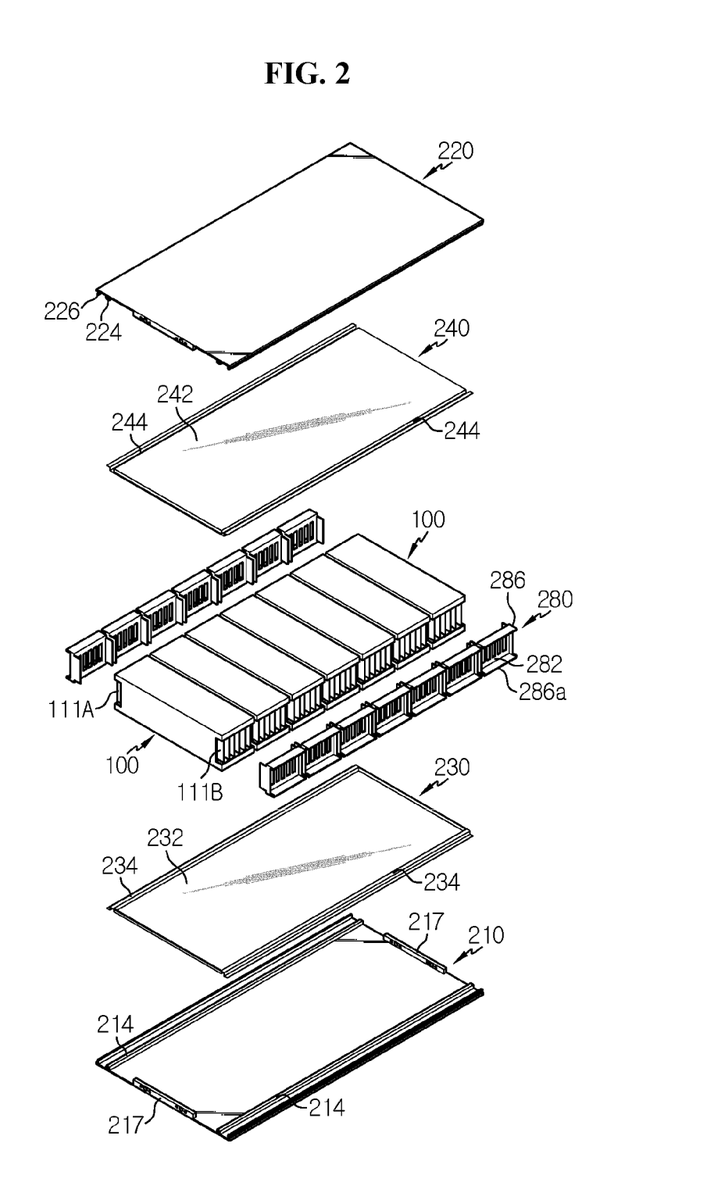
FIG. 2 is an exploded perspective view schematically showing the components of a battery module according to an embodiment of the present disclosure.
Figure 3:
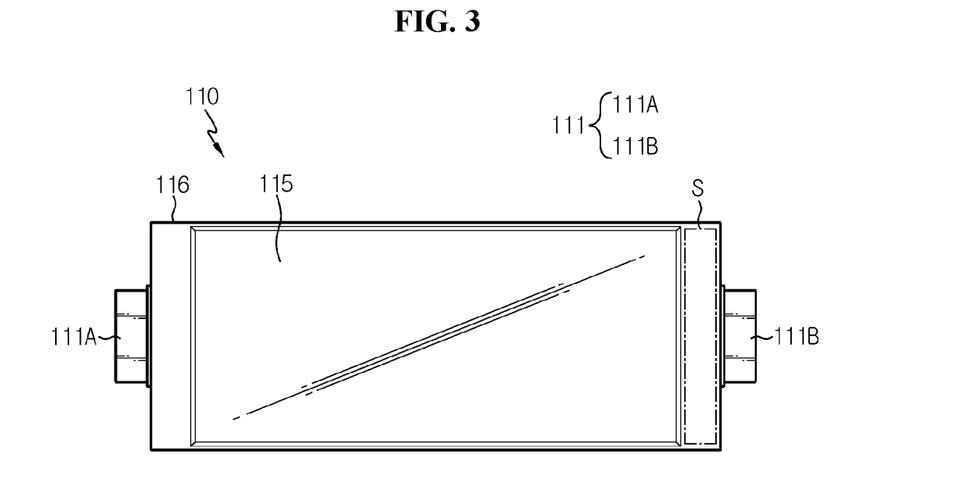
FIG. 3 is a side view schematically showing a secondary battery of a battery module according to an embodiment of the present disclosure.

FIG. 1 is a perspective view schematically showing a battery module according to an embodiment of the present disclosure. FIG. 2 is an exploded perspective view schematically showing the components of the battery module according to an embodiment of the present disclosure. FIG. 3 is a side view schematically showing a secondary battery of the battery module according to an embodiment of the present disclosure.

Referring to FIGS. 1 to 3, the battery module 200 of the present disclosure may include at least one or more cell assemblies 100, a base plate 210, and at least one base insulation member 230.

Here, the cell assembly 100 may include a plurality of secondary batteries 110 stacked in the front-rear direction. Here, the secondary battery 110 refers to a cell unit of a rechargeable lithium secondary battery. Specifically, the secondary battery 110 may be a pouch-type secondary battery 110. For example, as shown in FIG. 2, each of two cell assemblies 100 may include the plurality of pouch-type secondary batteries 110 stacked side by side in the front-rear direction when viewed from the direction F.

In particular, the pouch-type secondary battery 110 may include an electrode assembly (not shown), an electrolyte solution (not shown) and a pouch 116.

Each secondary battery 110 may stand in a direction (z direction) perpendicular to the ground with two wide surfaces disposed in the front-rear direction and sealing portions disposed in the up, down, left and right directions, when viewed in the direction F (shown in FIG. 1). In other words, each secondary battery 110 may stand upright in the vertical direction. In the specification, unless otherwise specified, the up, down, front, rear, left, and right directions are defined when viewed from the direction F.

Here, the pouch 116 may have a concave receiving portion 115. The electrode assembly and the electrolyte solution may be received in the receiving portion 115. Each pouch may include an outer insulating layer, a metal layer and an inner insulating layer, and the inner adhesive layers may adhere to each other at the edges of the pouch to form a sealing portion. A terrace portion S may be formed at each of the left and right ends at which a positive electrode lead 111A and a negative electrode lead 111B of the secondary battery 110 are formed.

The electrode assembly may be an assembly of an electrode plate coated with an electrode active material and a separator, and may include at least one positive electrode plate and at least one negative electrode plate with the separator. The positive electrode plate of the electrode assembly may have a positive electrode tab, and at least one positive electrode tab may be connected to the positive electrode lead 111A.

Here, the positive electrode lead 111A may have one end connected to the positive electrode tab and the other end exposed through the pouch, and the exposed portion may serve as an electrode terminal of the secondary battery 110, for example, a positive electrode terminal of the secondary battery 110.

The negative electrode plate of the electrode assembly may have a negative electrode tab, and at least one negative electrode tab may be connected to the negative electrode lead 111B. The negative electrode lead 111B may have one end connected to the negative electrode tab and the other end exposed through the pouch, and the exposed portion may serve as an electrode terminal of the secondary battery 110, for example, a negative electrode terminal of the secondary battery 110.

As shown in FIG. 3, when viewed in the direction F of FIG. 1, the positive electrode lead 111A and the negative electrode lead 111B may be formed at the left and right ends in opposite directions (x direction) with respect to the center of the secondary battery 110. That is, the positive electrode lead 111A may be provided at one end (the right end) with respect to the center of the secondary battery 110. The negative electrode lead 111B may be provided at the other end (the left end) with respect to the center of the secondary battery 110.

For example, as shown in FIG. 2, each secondary battery 110 of the cell assembly 100 may have the positive electrode lead 111A and the negative electrode lead 111B extending in the left-right direction.

Here, the terms representing the directions such as front, rear, left, right, up, and down may vary depending on the position of the observer or the placement of the object. However, in the specification, for convenience of description, the directions such as front, rear, left, right, up, and down are defined when viewed from the direction F.

According to this configuration of the present disclosure, it is possible to increase the area of the electrode lead without interference between the positive electrode lead 111A and the negative electrode lead 111B of one secondary battery 110.

The positive electrode lead 111A and the negative electrode lead 111B may be formed in a plate shape. In particular, the positive electrode lead 111A and the negative electrode lead 111B may extend in the horizontal direction with the wide surfaces standing upright in the front-rear direction. Here, the horizontal direction refers to a direction parallel to the ground when the battery module 200 is placed on the ground, and may be referred to as at least one direction on a plane perpendicular to the vertical direction.

However, the battery module 200 according to the present disclosure is not limited to the pouch-type secondary battery 110 described above and may use various types of secondary batteries 110 known at the time of filing the application.

The at least two cell assemblies 100 may be arranged in the front-rear direction. For example, as shown in FIG. 2, the two cell assemblies 100 may be arranged in the front-rear direction, and the two cell assemblies 100 may be spaced a predetermined distance apart from each other.

Specifically, the base plate 210 may be disposed below the cell assembly 100. That is, the base plate 210 may have a larger area than the lower surface of the at least one cell assembly 100 to mount the at least two cell assemblies 100 on top. The base plate 210 may be in the shape of a plate extending in the horizontal direction.

Here, the base plate 210 may include a metal material having high mechanical stiffness. For example, the metal may be an aluminum alloy, stainless steel or steel.

The base insulation member 230 may be interposed between the cell assembly 100 and the base plate 210. The base insulation member 230 may include an electrically insulating material. For example, the base insulation member 230 may include polycarbonate.

The base insulation member 230 may have a receiving portion 232 formed concavely in the downward direction to receive a part of the cell assembly 100. The receiving portion 232 may be configured to cover the bottom of the cell assembly 100. For example, the receiving portion 232 may mount seven cell assemblies 100. The receiving portion 232 may have a front wall, a rear wall, a left wall and a right wall. The base insulation member 230 may be manufactured using a vacuum mold. The vacuum molding method may include applying heat to a material of an insulation member, putting in a mold, and sucking air through a hole of the mold to form a shape, followed by cooling, demolding and trimming.

According to this configuration of the present disclosure, the present disclosure includes the base plate 210 disposed below the cell assembly 100 and the at least one base insulation member 230 interposed between the cell assembly 100 and the base plate 210 and having the receiving portion 232 formed concavely in the downward direction to receive a part of the cell assembly 100, thereby effectively electrically isolating the base plate 210 from the cell assembly 100. Furthermore, the receiving portion 232 provided in the base insulation member 230 may prevent the leaking electrolyte solution from flowing out of the battery module 200 when the electrolyte solution leakage occurs due to abnormal behaviors during the charge and discharge of the battery module 200. Accordingly, it is possible to greatly increase the safety of the battery module 200 while in use.

Referring back to FIGS. 1 and 2, the battery module 200 of the present disclosure may further include a top plate 220 and a top insulation member 240. The top plate 220 may be mounted on top of the cell assembly 100. That is, the top plate 220 may extend in the horizontal direction.

Here, the top plate 220 may include a metal material having high mechanical stiffness. For example, the metal may be an aluminum alloy, stainless steel or steel.

The top insulation member 240 may include an electrically insulating material. For example, the top insulation member 240 may include polycarbonate.

The top insulation member 240 may be interposed between the cell assembly 100 and the top plate 220. The top insulation member 240 may include a receiving portion 242 formed concavely in the upward direction to receive a part of the cell assembly 100. The receiving portion 242 may have a front wall, a rear wall, a left wall and a right wall.

According to this configuration of the present disclosure, the present disclosure includes the at least one top insulation member 240 interposed between the cell assembly 100 and the top plate 220, and having the receiving portion 242 formed concavely in the upward direction to receive a part of the cell assembly 100, thereby effectively electrically isolating the top plate 220 from the cell assembly 100. Furthermore, the receiving portion 242 provided in the base insulation member 230 may prevent the leaking electrolyte solution from spreading out from the top of the battery module 200 when the electrolyte solution leakage occurs due to abnormal behaviors during the charge and discharge of the battery module 200. Accordingly, it is possible to greatly increase the safety of the battery module 200 while in use.

Figure 4:
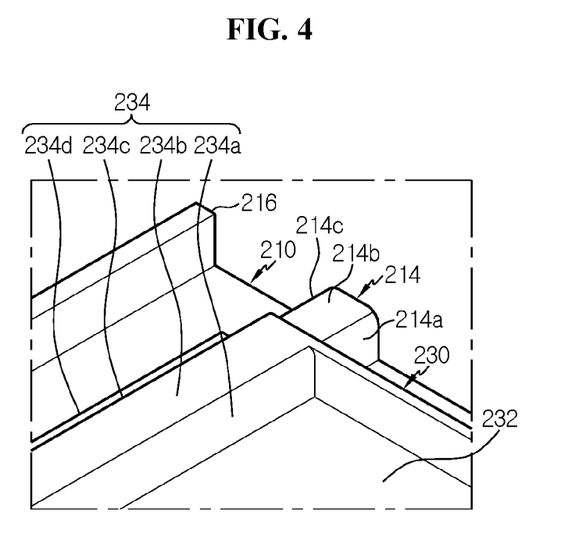
FIG. 4 is a partial enlarged view schematically showing some components of a battery module according to an embodiment of the present disclosure.

FIG. 4 is a partial enlarged view schematically showing some components of a battery module according to an embodiment of the present disclosure.

Referring to FIG. 4 together with FIGS. 1 and 2 again, the base plate 210 may include a compartment portion 214 extending upwards on each of the left and right sides at the lower end of the cell assembly 100. The compartment portion 214 may extend from the front end of the base plate 210 to the rear end. The compartment portion 214 may have a concave-convex shape. That is, the compartment portion 214 may have an inner sidewall 214a bent upwards, an upper wall 214b extending to the left and right and an outer sidewall 214c bent downwards. An outer peripheral wall 216 extending in the upward direction may be provided on the right and left outer peripheries of the base plate 210.

According to this configuration of the present disclosure, the present disclosure includes the compartment portion 214 extending in the upward direction on each of the left and right sides at the lower end of the cell assembly 100, thereby limiting the leftward and rightward movements of the cell assembly 100 mounted on the base plate 210. Accordingly, the cell assembly 100 may be kept in stable mounted state on the base plate 210. Accordingly, it is possible to increase the production efficiency and the stability of the battery module 200.

Additionally, the top plate 220 may include a compartment portion 224 extending downwards on each of the left and right sides at the upper end of the cell assembly 100. The compartment portion 224 may extend from the front end of the top plate 210 to the rear end. The compartment portion 224 may have a concave-convex shape. That is, the compartment portion 224 may have an inner sidewall bent downwards, a lower wall extending to the left and right and an outer sidewall bent upwards. An outer peripheral wall 226 extending in the downward direction may be provided on each of the right and left ends of the top plate 220.

According to this configuration of the present disclosure, the present disclosure includes the compartment portion 224 extending in the downward direction on each of the left and right sides at the upper end of the cell assembly 100, so that the top plate 210 may limit the top of the cell assembly 100 from moving to the left and right. Accordingly, the cell assembly 100 may not move. Accordingly, it is possible to increase the stability of the battery module 200.

Referring to FIG. 4 together with FIG. 2 again, the base insulation member 230 may include a fixing portion 234 fixed to the compartment portion 214 provided in the base plate 210. The fixing portion 234 may extend to the left and right from the receiving portion 232. In other words, the fixing portion 234 may be provided on each of the left and right sides of the receiving part 232. The fixing portion 234 may extend with at least one bending to cover the compartment portion 214 of the base plate 210.

For example, as shown in FIG. 4, the fixing portion 234 of the base insulation member 230 may include an inner bent structure 234a bent in the upward direction from the end of the receiving part 232 to cover the inner sidewall 214a of the compartment portion 214 of the base plate 210, an extension structure 234b extending to the left from the inner bent structure 234a to cover the upper wall 214b of the compartment portion 214, an outer bent structure 234c bent in the downward direction from the extension structure 234b, and an end structure 234d extending in the horizontal direction along the outer surface of the base plate 210 from the outer bent structure 234c.

According to this configuration of the present disclosure, the base insulation member 230 includes the fixing portion 234 extending to the left and right from the receiving portion 232 and extending with at least one bending to cover the compartment portion 214 of the base plate 210, thereby stably fixing the base insulation member 230 onto the base plate 210. Accordingly, it is possible to increase the production efficiency of the battery module 200 and help to prevent the base insulation member 230 from being separated from the base plate 210.

Referring back to FIG. 2, the top insulation member 240 may include a fixing portion 244 to be fixed to the compartment portion 224 provided in the top plate 220. The fixing portion 244 may extend to the left and right from the receiving portion 232. The fixing portion 244 may extend with at least one bending to cover the compartment portion 224 of the top plate 220.

For example, the fixing portion 244 of the top insulation member 240 may include an inner bent structure bent in the downward direction to cover the inner sidewall of the compartment portion 224 of the top plate 220, an extension structure extending to the left to cover the lower wall of the compartment portion 224, an outer bent structure bent in the upward direction from the extension structure, and an end structure extending in the horizontal direction along the outer surface of the top plate 220 from the outer bent structure.

According to this configuration of the present disclosure, the top insulation member 240 includes the fixing portion 244 extending to the left and right from the receiving portion 232 and extending with at least one bending to cover the compartment portion 224 of the top plate 220, thereby stably fixing the top insulation member 240 onto the top plate 220. Accordingly, it is possible to increase the production efficiency of the battery module 200 and help to prevent the top insulation member 240 from being separated from the top plate 220.

Referring back to FIG. 2, the base plate 210 may include a stopper 217 on the inner side to support each of the front outer side or the rear outer side of the receiving portion 232 of the base insulation member 230. For example, as shown in FIG. 2, the stopper 217 may be provided at each of the front end and the rear end of the base plate 210. The stopper 217 may extend in the upward direction from the base plate 210. That is, the stopper 217 may be in the shape of a plate standing upright.

Additionally, the top plate 220 may include a stopper 227 on the inner side to support each of the front outer side or the rear outer side of the receiving portion 242 of the top insulation member 240 in the inward direction.

According to this configuration of the present disclosure, the base plate 210 and the top plate 220 include the stopper 217, 227 on the inner side, thereby preventing the cell assembly 100 mounted on the base plate 210 from moving forwards or backwards due to an external shock. Accordingly, it is possible to effectively increase the safety of the battery module 200.

Referring back to FIG. 2, the battery module 200 may further include a busbar assembly 280. More specifically, the busbar assembly 280 may include at least one busbar 282 configured to electrically connect the plurality of secondary batteries 110, and at least two busbar frames 286 configured to mount the at least one busbar 282 on the outer side. The at least two busbar frames 286 may be provided on each of the left and right sides of the cell assembly 100.

A cover portion 286a extending to the left or right may be provided at each of the upper end and the lower end of the busbar frame 286.

More specifically, the busbar 282 may include a conductive metal, and for example, may include copper, aluminum and nickel.

The busbar frame 286 may include an electrically insulating material. For example, the busbar frame 286 may include a plastic material. More specifically, the plastic material may be polyvinyl chloride.

Figure 5:
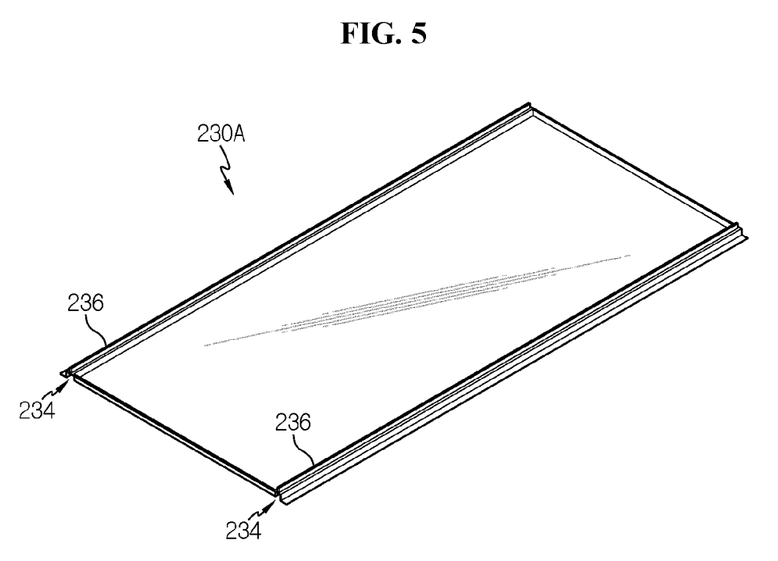
FIG. 5 is a perspective view schematically showing some components of a battery module according to another embodiment of the present disclosure.
Figure 6:
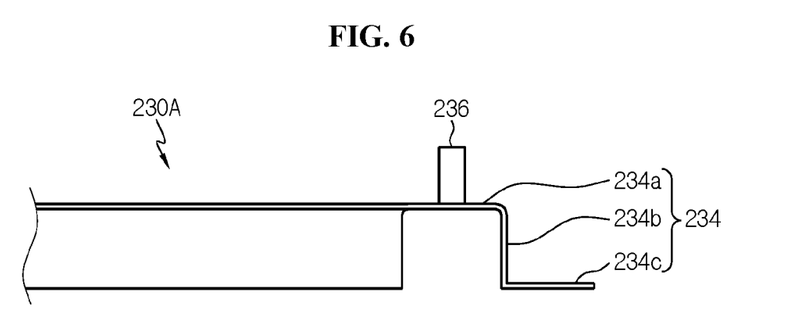
FIG. 6 is a partial front view schematically showing some components of a battery module according to another embodiment of the present disclosure.

FIG. 5 is a perspective view schematically showing some components of a battery module according to another embodiment of the present disclosure. FIG. 6 is a partial front view schematically showing some components of the battery module according to another embodiment of the present disclosure.

Referring to FIGS. 5 and 6 together with FIG. 2 again, a base insulation member 230A according to another embodiment of the present disclosure may further include a barrier 236, compared to the base insulation member 230 of FIG. 2. The remaining components are the same as the base insulation member 230 of FIG. 2.

The base insulation member 230A may include the barrier 236 disposed on the compartment portion 214 of the base plate 210 and extending to come into contact with the busbar frame 286. For example, as shown in FIG. 5, two barriers 236 may be respectively provided at parts of the base insulation member 230A in contact with the two compartment portions 214 provided on the left and right sides of the base plate 210. The barrier 236 may extend in the upward direction to be connected to (contact) the bottom of the busbar frame 286. More specifically, the barrier 236 may extend in the upward direction from the fixing portion 234 to be connected to the lower surface of the cover portion 286a disposed below the busbar frame 286. The barrier 236 may be hollow as a part of the base insulation member 230A.

According to this configuration of the present disclosure, the base insulation member 230A includes the barrier 236 disposed on the compartment portion 214 of the base plate 210 and extending to come into contact with the busbar frame 286, so that the electrolyte solution leaking out of the cell assembly 100 may be first collected in the receiving portion 232 provided in the base insulation member 230A, and then the barrier 236 may prevent the electrolyte solution received in the receiving portion 232 from flooding or leaking out due to an external impact. Accordingly, it is possible to greatly increase the safety of the battery module 200 while in use.

Figure 7:
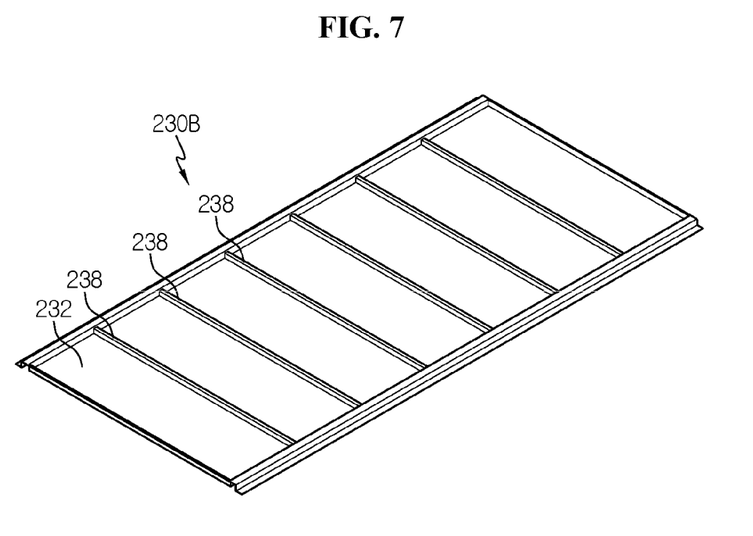
FIG. 7 is a perspective view schematically showing a base insulation member of a battery module according to still another embodiment of the present disclosure.

FIG. 7 is a perspective view schematically showing a base insulation member of a battery module according to still another embodiment of the present disclosure.

Referring to FIG. 7 together with FIG. 2 again, the battery module 200 may include at least two cell assemblies 100. The base insulation member 230B according to still another embodiment of the present disclosure may further include a partition 238 interposed between at least two cell assemblies 100, compared to the base insulation member 230 of FIG. 2. The remaining components are the same as the base insulation member 230 of FIG. 2.

For example, as shown in FIG. 2, the battery module 200 may include seven cell assemblies 100. As shown in FIG. 7, the base insulation member 230B may include six partitions 238 interposed between the seven cell assemblies 100. In this instance, the partition 238 may extend to the left and right to connect the fixing portions 234 disposed on the two sides. The upwardly extended size of the partition 238 may be equal to or smaller than the fixing portion 234.

According to this configuration of the present disclosure, the base insulation member 230B includes the partition 238 interposed between at least two cell assemblies 100, thereby guiding the location at which the plurality of cell assemblies 100 will be mounted using the partition 238. Additionally, the partition 238 may suppress the rapid spread of the electrolyte solution leaking out of the cell assembly 100 within the receiving portion 232. Accordingly, it is possible to effectively delay the leakage rate of the electrolyte solution out of the battery module 200.

Figure 8:
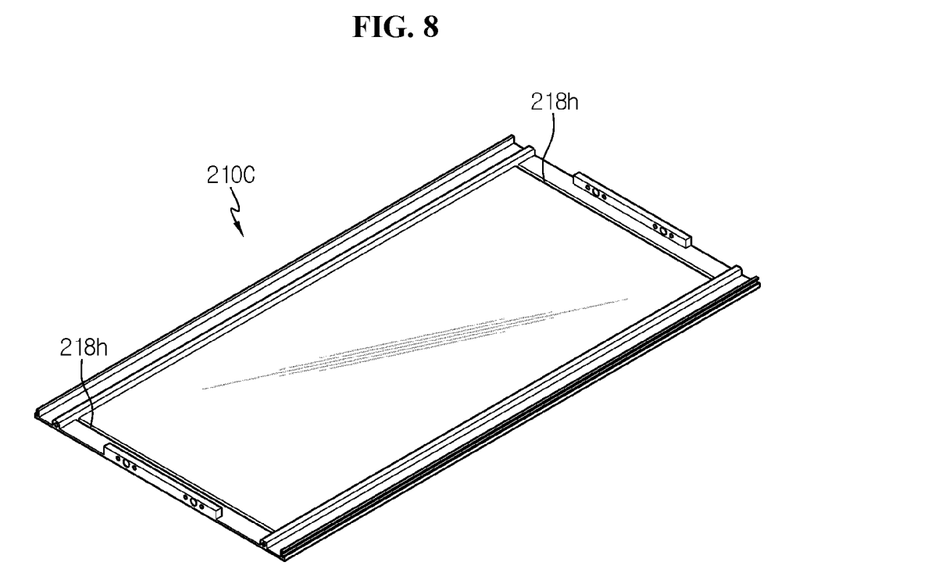
FIG. 8 is a perspective view schematically showing a base plate of a battery module according to still another embodiment of the present disclosure.
Figure 9:
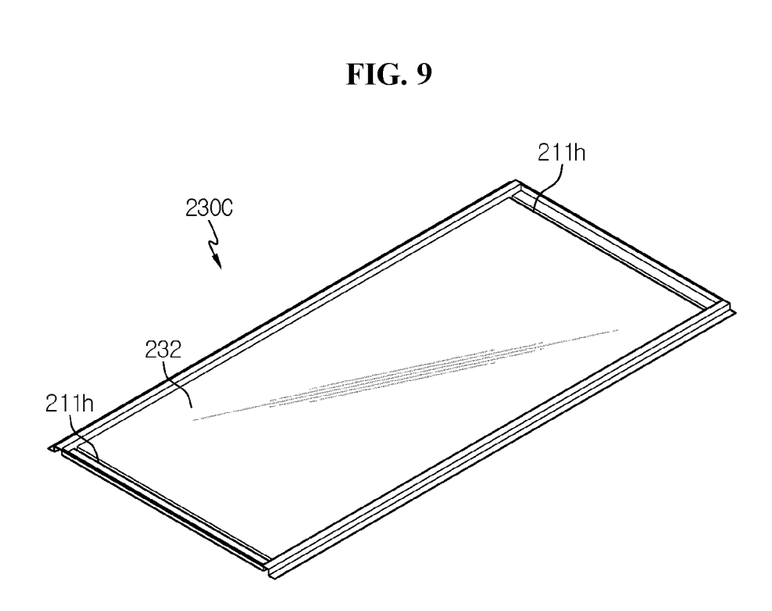
FIG. 9 is a perspective view schematically showing a base insulation member of a battery module according to still another embodiment of the present disclosure.

FIG. 8 is a perspective view schematically showing a base plate of a battery module according to still another embodiment of the present disclosure. FIG. 9 is a perspective view schematically showing a base insulation member of the battery module according to still another embodiment of the present disclosure.

Referring to FIGS. 8 and 9, the base plate 210C of the battery module according to still another embodiment of the present disclosure may further include a receiving groove 218h recessed in the downward direction, compared to the base plate 210 of FIG. 2. For example, as shown in FIG. 8, two receiving grooves 218h recessed in the downward direction and linearly extending to the left and right may be provided at the front end and the rear end of the base plate 210C respectively. The receiving groove 218h may extend to the left and right to connect the compartment portions 214 formed at the two ends.

As shown in FIG. 9, the base insulation member 230C may include an inner groove 211h which is inserted into the receiving groove 218h. For example, as shown in FIG. 9, the inner groove 211h linearly extending to the left and right may be provided at the front end and rear end of the base insulation member 230C respectively.

According to this configuration of the present disclosure, the base plate 210C includes the receiving groove 218h recessed in the downward direction, and the base insulation member 230C includes the inner groove 211h which is inserted into the receiving groove 218h, thereby receiving the leaking electrolyte solution in the receiving groove 218h when the electrolyte solution leaks out due to the abnormal behaviors during the charge and discharge of the cell assembly 100. That is, the receiving groove 218h may prevent the electrolyte solution from moving to the left and right where the electrode terminals or the busbars of the cell assembly 100 are disposed. It is possible to effectively prevent a short circuit of the cell assembly 100 caused by the leaking electrolyte solution. It is possible to prevent an additional accident, thereby increasing the safety of the battery module 200.

Figure 10:
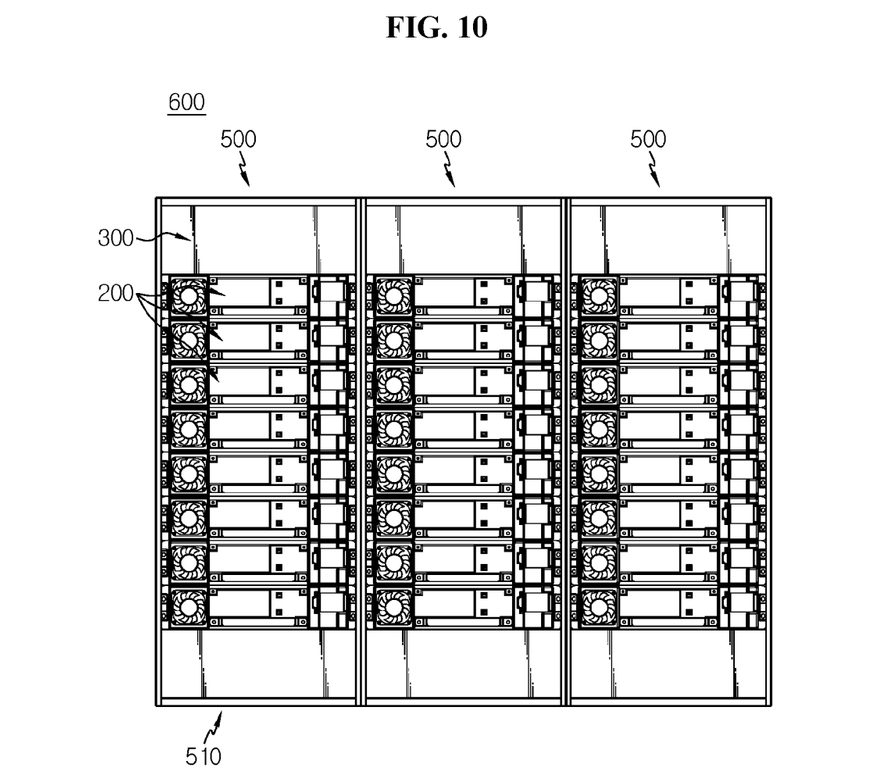
FIG. 10 is a front view schematically showing an energy storage system according to an embodiment of the present disclosure.

FIG. 10 is a front view schematically showing an energy storage system according to an embodiment of the present disclosure.

Referring to FIG. 10, a battery rack 500 according to an embodiment of the present disclosure may include at least two battery modules 200, and a rack case 510 to receive the battery modules 200. The rack case 510 may be configured to receive the plurality of battery modules 200 stacked in the vertical direction. In the rack case 510, the lower surface of the battery module 200 may be mounted parallel to the horizontal surface.

Here, the horizontal direction refers to a direction parallel to the ground when the battery module 200 is placed on the ground, and may be referred to as at least one direction on a plane perpendicular to the vertical direction.

The rack case 510 may be open to at least one side, and the battery module 200 may be inserted into the rack case 510 through the open side. However, the open side of the rack case 510 may be closed.

The battery rack 500 may further include other components such as a Battery Management System (BMS) 300 inside or outside the rack case 510.

Meanwhile, the energy storage system 600 according to an embodiment of the present disclosure may include at least two battery racks 500. The at least two battery racks 500 may be arranged in a direction. For example, as shown in FIG. 9, the energy storage system 600 may include three battery racks 500 arranged in a direction. The energy storage system 600 may include a central control unit (not shown) to control the charge and discharge of the three battery racks 500.

The terms indicating directions as used herein such as upper, lower, left, right, front and rear are used for convenience of description only, and it is obvious to those skilled in the art that the term may change depending on the position of the stated element or an observer.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

| [Description of Reference Numerals] | |
| --- | --- |
| 200: battery module | 100: cell assembly |
| 110: secondary battery | 210: base plate |
| 220: top plate | 230: base insulation member |
| 232, 242: receiving portion | |
| 240: top insulation member | |
| 214: compartment portion | |
| 234: fixing portion | |
| 217: stopper | 280: busbar assembly |
| 236: barrier | 238: partition |
| 218h: receiving groove | |
| 211h: inner groove | |
| 500: battery rack | 510: rack case |
| 600: energy storage system | |

INDUSTRIAL APPLICABILITY

The present disclosure relates to a battery module. In addition, the present disclosure may be used in the industry related to a battery rack or a large-scale energy storage system comprising the battery module.

What is claimed is:

1. A battery module, comprising:
at least one cell assembly including a plurality of secondary batteries stacked in a stacking direction, each secondary battery including an electrode lead;
a base plate disposed below the at least one cell assembly and extending in a horizontal direction to support a bottom of the at least one cell assembly; and
at least one base insulation member interposed between the at least one cell assembly and the base plate and having a first receiving portion to receive a part of the at least one cell assembly,
wherein the base plate includes a compartment portion extending in an upward direction on each of left and right sides of the base plate,
wherein the at least one base insulation member includes a fixing portion extending in the upward direction from the first receiving portion, and
wherein the compartment portion extends into the fixing portion.

2. The battery module according to claim 1, further comprising:
a top plate mounted on top of the at least one cell assembly and extending in the horizontal direction to cover a top of the at least one cell assembly; and
at least one top insulation member interposed between the at least one cell assembly and the top plate and having a second receiving portion formed concavely in an upward direction to receive a part of the at least one cell assembly.

3. The battery module according to claim 1, wherein the base plate further includes a stopper on an inner side to support a front outer side or a rear outer side of the first receiving portion of the at least one base insulation member.

4. The battery module according to claim 1, wherein the battery module further includes a busbar frame disposed on a left or right side of the at least one cell assembly, and having a through-hole through which at least one electrode lead extends, and a busbar assembly mounted on left and right outer sides of the busbar frame and having a conductive metal to electrically connect the plurality of secondary batteries, and
wherein the at least one base insulation member includes a barrier disposed on the compartment portion of the base plate and extending to contact the busbar frame.

5. The battery module according to claim 1, wherein the at least one cell assembly includes at least two cell assemblies, and
> wherein the at least one base insulation member includes a partition interposed between the at least two cell assemblies.

6. The battery module according to claim 1, wherein the base plate includes a receiving groove recessed in the downward direction, and
> wherein the at least one base insulation member includes an inner groove which is inserted into the receiving groove.

7. A battery rack comprising:
at least two battery modules according to claim 1; and
a rack case to receive the battery modules.

8. An energy storage system comprising at least two battery racks according to claim 7.

9. The battery module according to claim 1, wherein the compartment portion extends on each of two opposite sides of the at least one cell assembly,
> wherein each compartment portion includes an inner wall, an upper wall and an outer wall, and
> wherein each fixing portion comprises an inner bent portion, an extension portion and an outer bent portion.

10. The battery module according to claim 9, wherein the fixing portion further comprises an end structure extending outwardly from the outer bent portion.

11. The battery module according to claim 9, wherein the fixing portion further comprises a barrier extending upwardly from the extension portion.

12. The battery module according to claim 1, wherein the base plate includes a peripheral wall, and wherein the compartment portion is spaced inwardly from the peripheral wall.

13. The battery module according to claim 1, wherein a size and a shape of the fixing portion corresponds to a size and a shape of the compartment portion.

* * * * *